United States Patent
Culler (10) Patent No.: US 7,475,270 B1
(45) Date of Patent: *Jan. 6, 2009

(54) SYSTEM AND METHOD FOR WAVEFORM SAMPLING

(75) Inventor: Jason Harold Culler, Livermore, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 427 days.

This patent is subject to a terminal disclaimer.

(21) Appl. No.: 10/699,909

(22) Filed: Nov. 3, 2003

(51) Int. Cl.
*G06F 1/04* (2006.01)
*G06F 1/08* (2006.01)
*G06F 1/12* (2006.01)

(52) U.S. Cl. .............. 713/500; 713/400; 713/401; 713/501

(58) Field of Classification Search ............ 713/400, 713/401, 500, 501
See application file for complete search history.

(56) References Cited

U.S. PATENT DOCUMENTS

| | | | |
|---|---|---|---|
| 5,444,416 A * | 8/1995 | Ishikawa et al. ............ 329/341 |
| 5,459,435 A | 10/1995 | Taki |
| 5,465,277 A | 11/1995 | Schreurs et al. |
| 5,532,632 A | 7/1996 | Kent |
| 5,774,001 A | 6/1998 | Mozdzen et al. |
| 5,808,691 A | 9/1998 | Malcolm et al. |
| 5,892,384 A * | 4/1999 | Yamada et al. ............ 327/277 |
| 5,923,715 A | 7/1999 | Ono |
| 6,147,530 A | 11/2000 | Nogawa |
| 6,255,883 B1 | 7/2001 | Delvaux et al. |
| 6,269,135 B1 * | 7/2001 | Sander ........................ 375/354 |
| 6,317,071 B1 | 11/2001 | Kolsrud et al. |
| 6,326,826 B1 * | 12/2001 | Lee et al. ..................... 327/161 |
| 6,463,547 B1 | 10/2002 | Bailey et al. |
| 6,470,458 B1 | 10/2002 | Dreps et al. |
| 6,556,157 B1 | 4/2003 | Itani et al. |
| 6,701,445 B1 * | 3/2004 | Majos ........................ 713/500 |
| 7,046,057 B1 * | 5/2006 | Culler ......................... 327/156 |
| 7,127,022 B1 * | 10/2006 | Dieguez ..................... 375/375 |
| 2002/0026539 A1 | 2/2002 | Muthukumaraswamy et al. |
| 2002/0044617 A1 * | 4/2002 | Buchwald et al. .......... 375/355 |
| 2002/0053933 A1 | 5/2002 | Takahashi |
| 2002/0146084 A1 | 10/2002 | Cranford, Jr. et al. |
| 2002/0168043 A1 * | 11/2002 | Sander ........................ 375/355 |
| 2003/0052662 A1 * | 3/2003 | Bi et al. ..................... 324/76.39 |
| 2003/0143951 A1 | 7/2003 | Challa et al. |
| 2004/0139363 A1 * | 7/2004 | Elbe et al. ................... 713/400 |

OTHER PUBLICATIONS

Wikipedia, Normalized frequency, http://en.wikipedia.org/wiki/Normalized_frequency.*
Office Action dated Feb. 23, 2006 from U.S. Appl. No. 10/699,906.
Office Action dated Jul. 18, 2005 from U.S. Appl. No. 10/699,906.
Office Action dated Oct. 14, 2005 from U.S. Appl. No. 10/699,906.

* cited by examiner

*Primary Examiner*—Thomas Lee
*Assistant Examiner*—Fahmida Rahman (57) ABSTRACT

Systems and methods can be employed to sample a signal and determine a frequency of the signal. In one embodiment, the system may comprise a sample network that provides plural indications of signal state associated with different time instances of an input signal. A detector provides an indication of frequency for the input signal based on the plural indications of signal state.

31 Claims, 6 Drawing Sheets

SYSTEM AND METHOD FOR WAVEFORM SAMPLING

RELATED APPLICATION

This application is related to co-pending and commonly assigned U.S. patent application to J. Culler, which was filed contemporaneously with this application and entitled SYSTEM AND METHOD FOR SYNCHRONIZING DEVICES, application Ser. No. 10/699,906, which was filed Nov. 3, 2003, now U.S. Pat. No. 7,046,057, the disclosure of which is incorporated herein by reference.

BACKGROUND

Various applications sample signals to ascertain information from the signal. In microprocessors and other VLSI technology, for example, it is common to sample an input system clock signal for synchronization purposes. Typically, such synchronization systems employ phase locked loop (PLL) circuitry for synchronizing an internal or chip clock signal to a desired frequency. Two such synchronization approaches are a common clock input/output (I/O) system and a source synchronous I/O system. A traditional common clock distribution architecture utilizes a common clock source that supplies a clock signal for timing and latching of data. In a typical source synchronous I/O system, strobe information may be sent with data to provide a clock edge for instructing the recipient of the data when to clock or latch the data.

SUMMARY

One embodiment of the present invention may comprise a system that includes a sample network that provides plural indications of signal state associated with different time instances of an input signal. A detector provides an indication of frequency for the input signal based on the plural indications of signal state.

Another embodiment of the present invention may comprise a system that includes a plurality of storage elements, the plurality of storage elements being activated to latch different time instances of an input signal to provide corresponding output samples sufficient for determining frequency characteristics of the input signal.

Yet another embodiment of the present invention may comprise a method that includes sampling a signal at predetermined spaced apart time intervals to provide a plurality of output samples indicative of signal state for different time instances of the signal. The method also includes determining an indication of frequency for the signal based on the plurality of output samples.

DETAILED DESCRIPTION

This disclosure relates generally to waveform sampling, such as can be employed to ascertain an indication of frequency for a sampled waveform. A plurality of samples for different time instances of an input waveform are provided. An indication of frequency can be derived based on the plurality of samples, such as according to values of the waveform at the sampled time instances.

Figure 1:
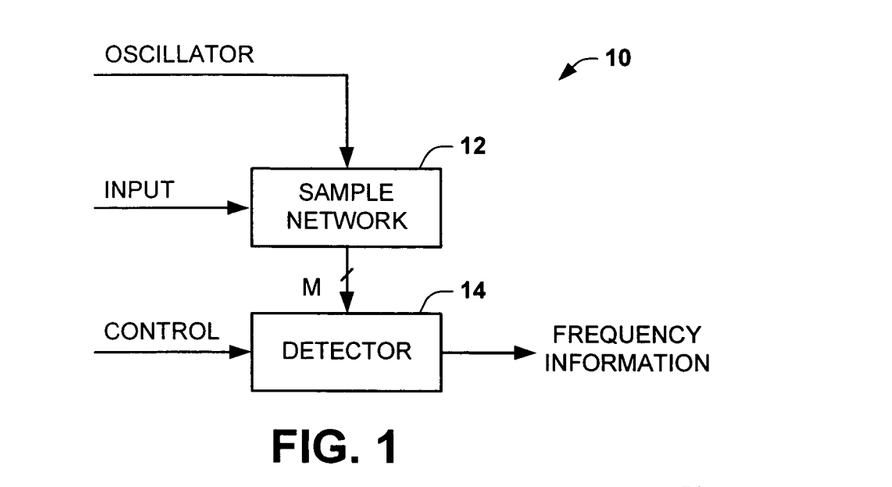
FIG. 1 depicts an example of one embodiment of a sampling system.

FIG. 1 depicts an example of a sampling system 10 that can be employed for frequency detection. The system 10 includes a sample network 12 that receives an INPUT signal having a frequency to be determined by the system. The sample network 12 also may receive an OSCILLATOR signal that controls the sample rate implemented by the sample network 12. For example, the OSCILLATOR signal can be provided at a frequency that is greater (e.g., at least four times greater) than the INPUT signal. Alternatively, the OSCILLATOR signal can be less than or even equal to the INPUT signal. For example, the INPUT signal can itself be used as the OSCILLATOR signal for clocking the sample network 12. The sample network 12 may employ registers or latches that are activated based on the OSCILLATOR signal to sample time instances of the INPUT signal.

The sample network 12 provides an output signal to a detector 14. The output signal can be an M-bit data signal or M-data signals indicating information about different sampled parts of the INPUT signal. For example, the M output signals from the sample network 12 can correspond to state information (e.g., high or low) for different time instances of the INPUT signal, such as at spaced apart time intervals. The time intervals between the M output signals correspond to respective time delays implemented by the sample network 12 associated with each of the respective M output signals. The sample network 12, for example, can latch the state information for different time instances of the INPUT signal to provide the M-output signals, with each output signal corresponding to a different predetermined amount of delay on the INPUT signal. Alternatively, digital data indicative of the different sampled time instances can be derived from the sampled time instances of the INPUT signal and provided as the output signal to the detector 14.

The detector 14 is operative to provide frequency information based on the output signal(s) from the sample network 12. For example, because an amount of delay associated with each of the respective M-output signals is known, the detector 14 can compute frequency for the INPUT signal based on the time interval between state transitions in the INPUT signal. The time interval between a pair of state transition in the INPUT signal may be determined from the number or amount of delays implemented by the sample network 12 for the signals that provide the transitions.

By way of example, assuming that the INPUT signal has a fifty-percent duty cycle, the detector 14 can be operative to determine an indication of frequency for the INPUT signal based on the time interval between state transitions in the INPUT signal (e.g., between a rising edge and a falling edge or between a falling edge and a rising edge). This, for example, can be determined by taking four or more samples of the INPUT signal during one-half period that includes such transitions. The detector 14 can ascertain an indication of the period of the INPUT signal based on the time interval between transitions, from which an indication of the frequency can be computed to provide the frequency information. Where the duty cycle is different from fifty-percent, a greater sampling interval may be utilized, such as covering an entire period (e.g., three or more transitions) of the INPUT signal.

The detector 14 can also receive a CONTROL signal that controls the frequency determination implemented by the detector 14. For example, the CONTROL signal can be provided by a state machine or other device at a desired rate to activate the detector 14 for reading the M-output signals and determining the frequency information. Additionally or alternatively, the detector 14 can implement averaging of the frequency information to mitigate the effects of potentially spurious signals being provided by the sample network 12. The particular rate at which the detector 14 provides updated frequency information can vary, for example, depending on the application in which the system 10 is being implemented.

Figure 2:
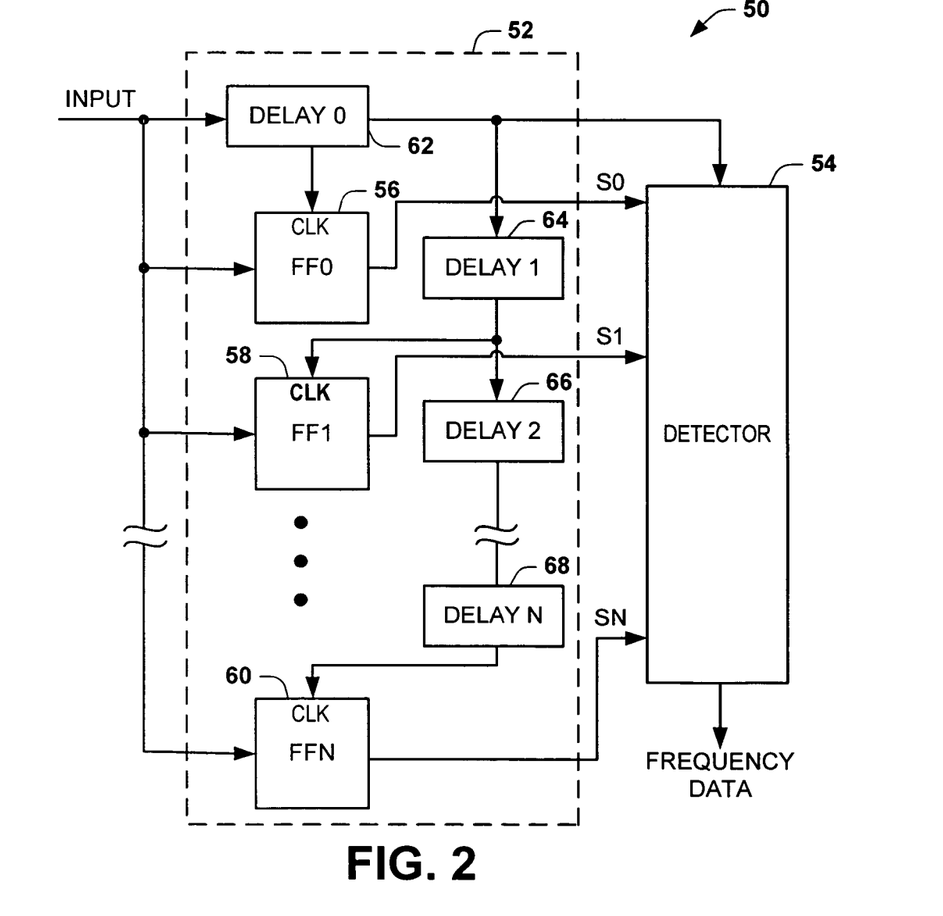
FIG. 2 depicts an example of another embodiment of a waveform sampling system.

FIG. 2 illustrates an example of one embodiment of a frequency detection system 50. The system 50 includes a sample network 52 that provides state information associated with different time instances of an INPUT signal to a detector 54, indicated at samples S0, S1 and SN, where N is a positive integer (N≧1)). The detector 54 is programmed and/or configured to provide FREQUENCY DATA indicative of the frequency of the INPUT signal based on the output samples S0-SN provided by the sample network 52.

In this example, the sample network 52 includes a plurality of storage elements 56, 58 and 60. The storage elements 56-60, for example, can be latches, buffers or registers, inverters or any other device that can selectively pass or latch signal state information (e.g., corresponding to the value or amplitude of the signal) to an output thereof. In one embodiment, the storage elements 56-60 can be implemented as D-type flip flops or any other logic device (indicated respectively at FF0, FF1 and FFN) operative to latch a particular time instance of the INPUT signal based on the control signals received at a clock input thereof. The storage elements 56-60 can provide the information at a desired rate, such as based on the OSCILLATOR (or another clock) signal. The rate at which the storage elements 56-60 are activated may vary according to the number of storage elements.

A plurality of delay elements (indicated at DELAY 0 through DELAY N) 62, 64, 66 and 68 are coupled to provide clock signals to the CLK inputs of the storage elements 56-60. The plurality of delay elements 62-68 are coupled in series between the INPUT signal and the storage element 60 for providing respective delayed signals to the CLK inputs of the storage elements 56-60. In this way, the amount of delay provided by each subsequent delay element in sample network corresponds to an aggregate amount of delay based on its own delay plus the amount of delay provided any preceding delay elements through which the INPUT signal propagates. As a result, the latch output signals S0-SN correspond to different sample portions of the INPUT signal.

In the example of FIG. 2, the INPUT signal is provided to the delay element 62, which in turn provides a delayed version of the INPUT signal to the CLK input of the storage element 56. The delay element 62 also provides the delayed version of the INPUT signal as an input to the delay element 64 as well as a clock input for controlling operation of the detector 54. The delay element 64 delays the previously delayed signal and provides the further delayed output signal to the CLK input of the storage element 58 as well as to the next delay element 66. A similar arrangement exists for the remaining delay elements, with the Nth delay element 68 providing a final delayed signal to the CLK input of the storage element 60. The storage element 60 in turn provides a sample output signal SN to the detector 54 indicative of the state of the INPUT signal at the time when the latch 60 is clocked by the delayed output signal from delay element 68.

The delay elements 62-68 can be any device operative to impose delay on a CLOCK signal, such as RC elements, inverters, metal lines, buffers, discrete logic gates and the like. The amount of delay implemented by the respective delay elements 62-68 can be the same or different, such as depending on the configuration of the sample network 52 and desired resolution.

The detector 54 is operative to provide the frequency data indicative of the frequency of the INPUT signal based on the output signals S0-SN. For instance, because the amount of delay associated with each of the delay elements 62-68 is known, the detector 54 can reconstruct the INPUT signal based on the state of the signals S0-SN and, in turn, determine the frequency of the INPUT signal. The accuracy of the resulting frequency determination generally depends on the amount of the delay and the number of delay elements in the network 52.

Figure 3:
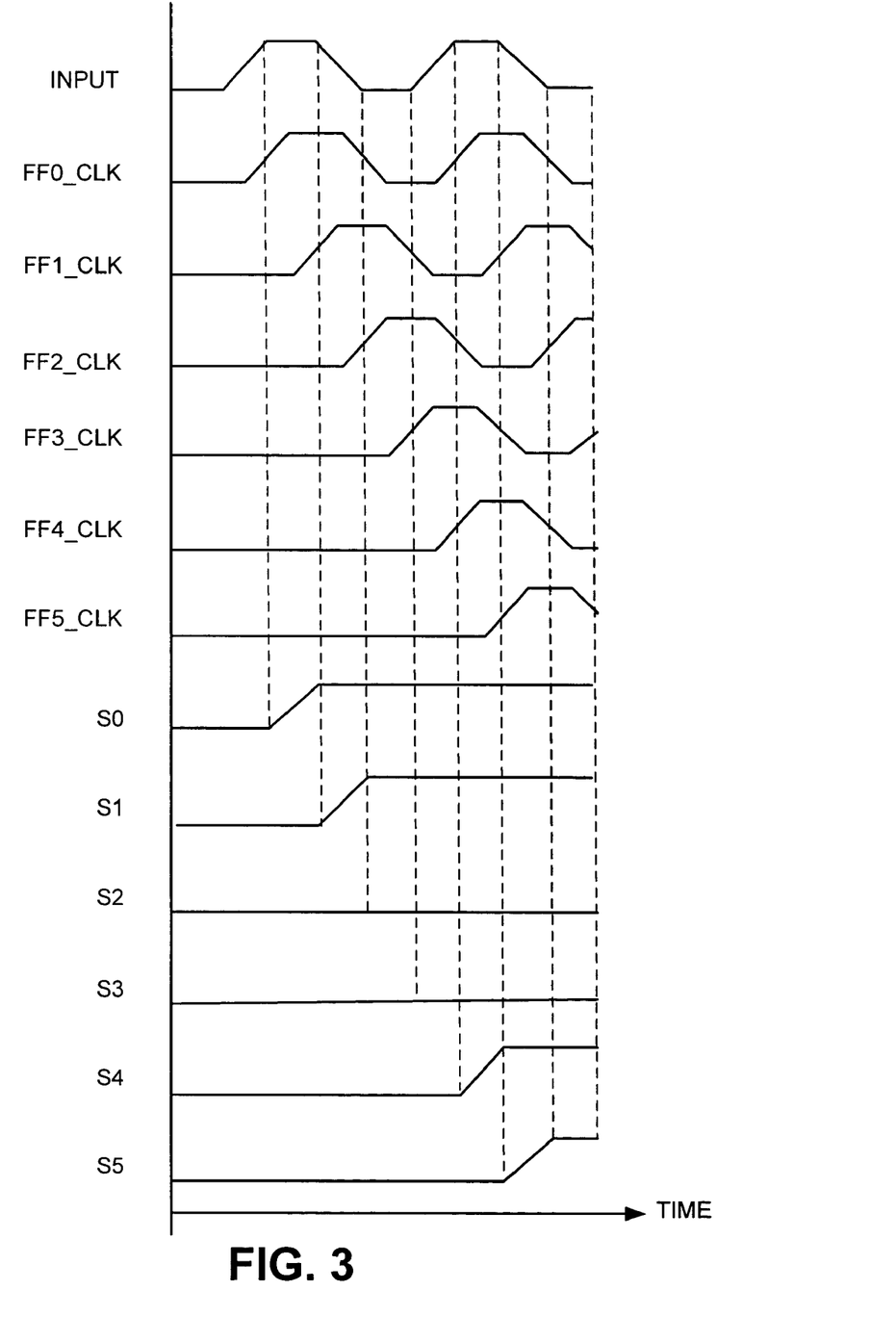
FIG. 3 is a graph depicting various waveforms of the system of FIG. 2.

By way of further example, FIG. 3 depicts an example of various waveforms associated with the system 50 of FIG. 2. In this example, it is assumed that the sample network provides six sample output signals S0, S1, S2, S3, S4, and S5 (e.g., there are six latches, or N=5). Also depicted in FIG. 3 are corresponding clock signals FF0_CLK, FF1_CLK, FF2_CLK, FF3_CLK, FF4_CLK and FF5_CLK, such as are provided by delay elements to CLK inputs of the respective storage elements. It will be appreciated that by delaying the INPUT signal through a plurality of delay elements, several different clock edges can be created for sampling the INPUT signal in a single period of this INPUT signal, as shown by signals FF0_CLK through FF5_CLK. Accordingly, by employing delay elements 62-68 arranged in the manner shown in FIG. 2, and implementing a delay that is a fractional part of the INPUT signal period, a desired plurality of clock edges in a single period of the INPUT signal can generate a desired number of clock edges. The clock edges are operative to clock associated storage elements 56-60 (FIG. 2) so as to provide a desired resolution of sampling for the INPUT signal.

The frequency data can be determined, for example by deriving an indication of frequency from the output signals S0-S5. In the example of FIG. 3, opposing state transitions are detected for output samples S1 and S4. In particular, S1 corresponds to a falling edge and S4 corresponds to a rising edge of the INPUT signal. Assuming a fifty-percent duty cycle, the period of the INPUT signal can be determined based on the amount of time associated with S1 going high through S4 going high. This time corresponds to the aggregate amount of delay implemented by the set of delay elements associated with the storage elements that provide the output signals S1-S4.

By way of further example, each of the delay elements 62-68 can implement a given amount of delay, such as 50 picoseconds. Thus, by knowing the amount of delay associated with each delay element, the amount of delay from the falling edge represented by the output at S1 and the rising edge represented by the output S4, the period of the INPUT signal can be determined in a straightforward manner. When a fifty-percent duty cycle can be assumed, the determination of the frequency is facilitated since the frequency can be obtained from samples obtained in one-half of a period for the INPUT signal (e.g., based on time between two adjacent, opposing state transitions). The number of output samples from one state transition to the next state transition can be multiplied by the corresponding amount of delay to provide a total delay between state transitions, which is functionally related to the period of the INPUT signal.

For the example of 50 picoseconds (ps) of delay implemented by each of the five delay elements associated with the falling edge of S1 to the rising edge of S4, a total delay of 250 ps is provided. This corresponds to one-half of the period of the INPUT signal, or a total period of 500 ps. The frequency f of the INPUT signal, being the inverse of the period, is $f=1/500E^{-12}=2$ GHz. In the event that a fifty-percent duty cycle is not utilized, it may be necessary to sample more than one-half of a period of the INPUT signal, such as an entire period, to provide an accurate indication of the period of the INPUT signal (e.g., the time between two rising or falling edges).

Figure 4:
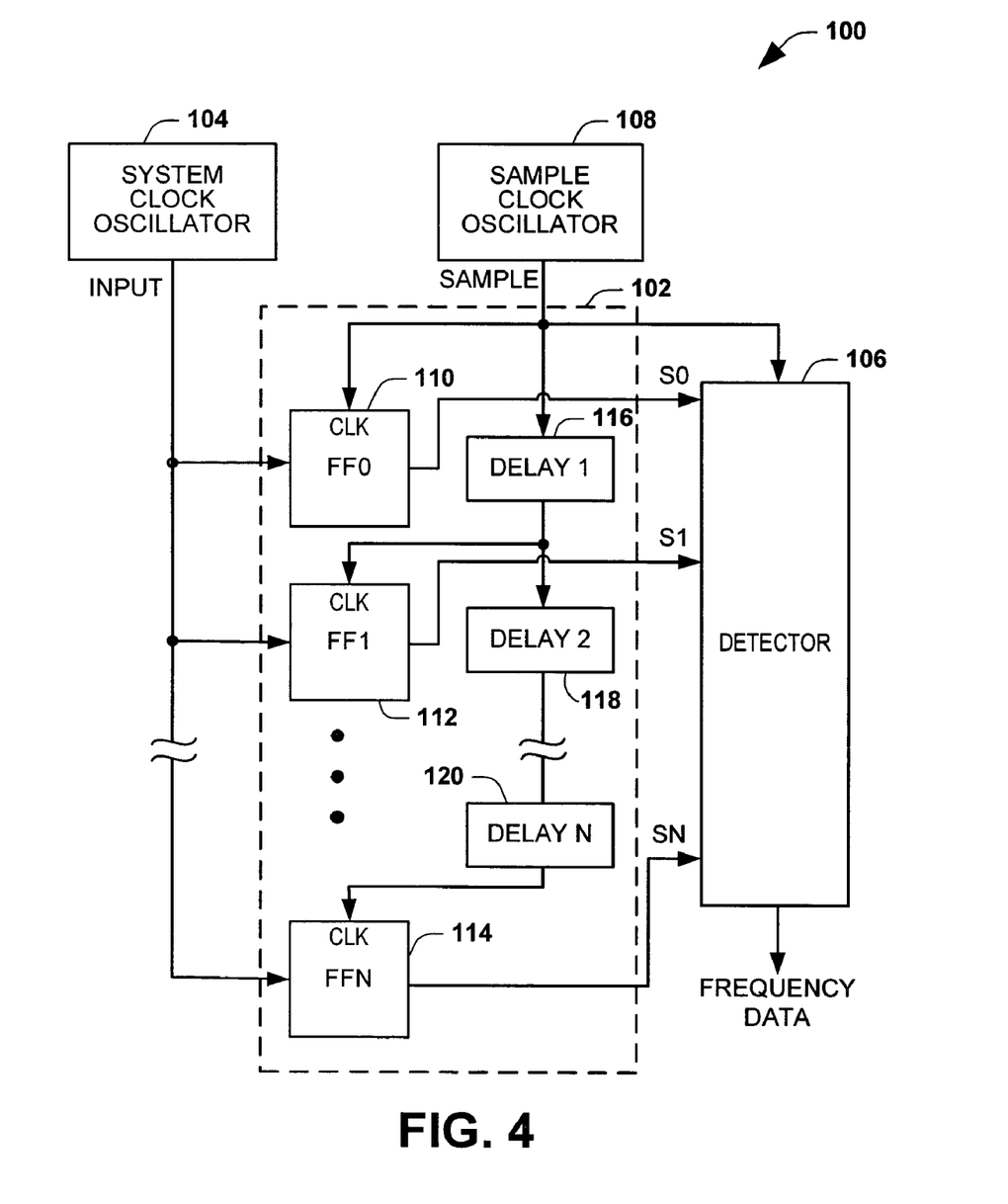
FIG. 4 depicts another embodiment of a sampling system.

FIG. 4 depicts an example of another embodiment of a frequency detection system 100. The system 100 includes a sample network 102 that is operative to sample an INPUT signal provided by a system clock oscillator 104. The sample network 102 provides a plurality of sample signals S0, S1, and SN to a detector 106. The sample signals S0-SN correspond to different time instances of the INPUT signal provided by the system clock oscillator 104. The sample network 102 is activated based on a SAMPLE signal, such as can be provided by a sample clock oscillator 108. The sample clock oscillator 108, for example, can provide the SAMPLE signal to the sample network 102 at a frequency that is less than or equal to the frequency of INPUT signal provided by the system clock oscillator 104. Alternatively, the sample clock oscillator 108 may provide the SAMPLE clock signal at a frequency that is greater than the frequency of the INPUT signal.

In the example of FIG. 4, the INPUT signal is provided to inputs of respective storage elements (e.g., latches, buffers, registers or the like), indicated at 110, 112 and 114 (FF0, FF1 and FFN, respectively). The storage elements 110-114 provide the respective sample output signals S0-SN based on clock signals provided to respective CLK inputs thereof.

In the example of FIG. 4, the sample network 102 also includes a plurality of delay elements 116, 118 and 120 (DELAY 1, DELAY 2, DELAY N). The delay elements 116-120 are connected in series between the sample clock oscillator 108 and the storage element 114, such that an amount of delay on the SAMPLE clock signal is accumulated as the SAMPLE signal propagates through the respective delay elements 116-120. The sample clock oscillator 108 provides the SAMPLE clock signal to the CLK input of the storage element 110 as well as to a clock input of the detector 106.

The sample clock oscillator 108 also provides the SAMPLE clock signal to the delay element 116, which delays the SAMPLE signal to provide a delayed output signal. The delayed output signal is provided to the CLK input of the storage element 112 and to an input of the delay element 118. The delay element 118 provides a further delayed version of the SAMPLE signal to a CLK input of another storage element (not shown) as well as to a next delay element (also not shown). The delay element 120 provides its output signal (e.g., corresponding to the SAMPLE signal having been delayed N times) to the CLK input of the storage element 114.

By appropriately configuring the amount of delay provided by the respective delay elements 116-120 and implementing the sample clock oscillator 108 to provide the SAMPLE signal at a desired rate, a sufficient number of clock edges for activating the storage elements 110-114 can be generated to provide for oversampling (e.g., at least four times oversampling) of the INPUT signal.

It will be understood and appreciated that the frequency of the SAMPLE signal provided by the oscillator 108 can even be lower than the frequency of the INPUT signal provided by the system clock oscillator 104. For example, if the delay elements 116-120 implement sufficiently small amounts of delay and a sufficient number of delay elements are provided, the delay elements can provide a plurality of clock edges for activating the respective storage elements 110-114 to obtain plural samples over a portion of the INPUT signal. As mentioned above, the frequency of the INPUT signal may be determined based on the number of delay elements associated with storage elements providing sample output signals for adjacent transition edges of the INPUT signal (e.g., about one-half a period assuming a fifty percent duty cycle).

Figure 5:
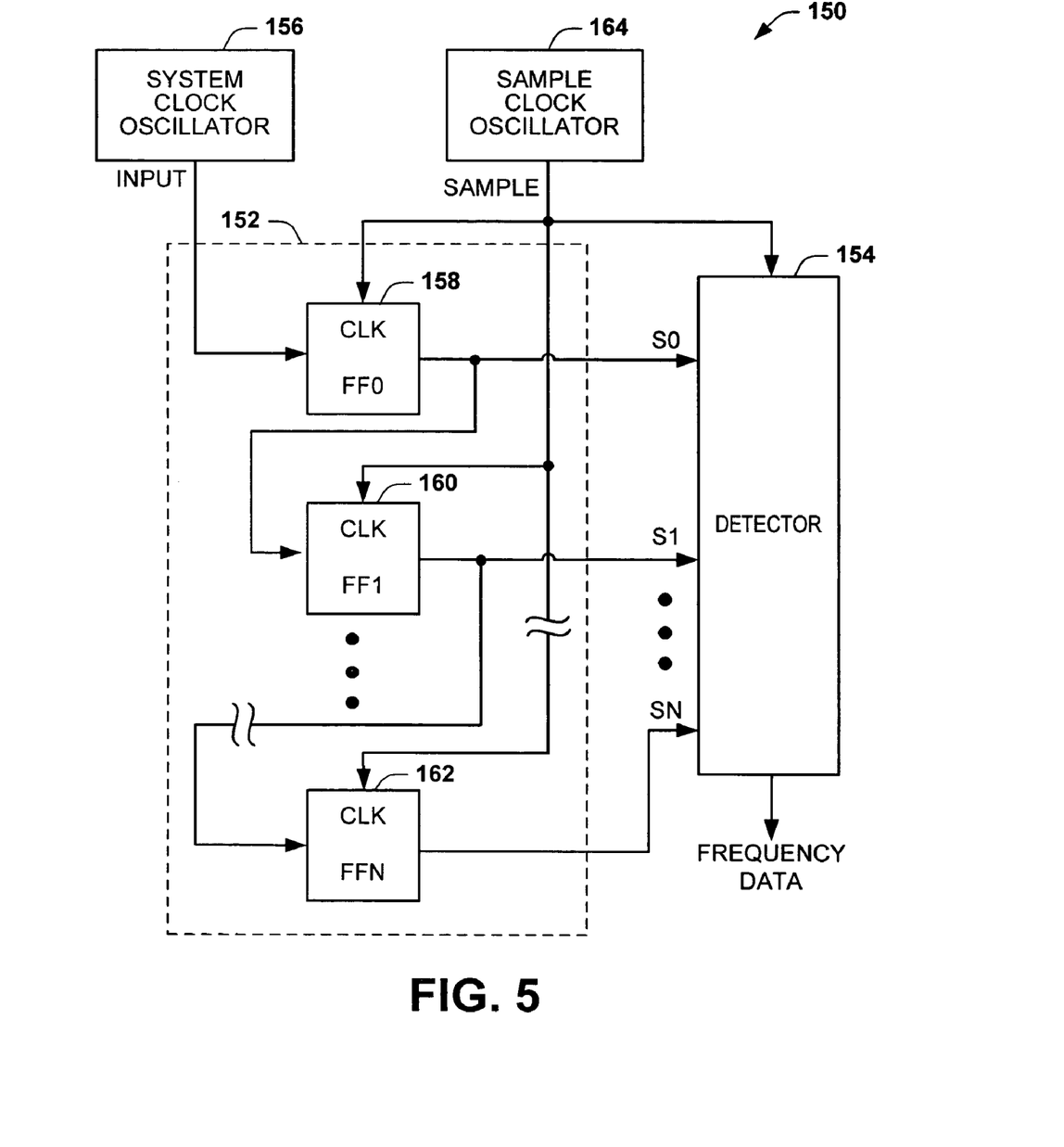
FIG. 5 depicts yet another embodiment of a sampling system.

FIG. 5 depicts an example of another embodiment of a frequency detection system 150. The system 150 includes a sample network 152 that is operative to provide sample signals S0-SN to a detector 154. The sample signals S0-SN provide signal state information for a different time instances of an INPUT signal provided by an associated system clock oscillator 156.

The sample network 152 includes a plurality of storage elements or registers 158, 160 and 162 (indicated at FF0, FF1 and FFN). Each of the storage elements 158-162 provides a respective one of the sample output signals S0-SN. A sample clock oscillator 164 provides a SAMPLE signal for clocking or activating the respective storage elements 158-160. In particular, the SAMPLE signal is provided to a CLK input of each of the respective storage elements 158-162. The system clock oscillator 156 provides the INPUT signal to an input of the storage elements 158. The storage element 158 provides the sample output signal S0, which also is provided to an input of the storage element 160. The storage element 160 provides the sample output S1, which also provides an input to a next storage element of the sample network 152. The output of any subsequent storage elements (not shown) also may provide additional sample output signals, each of which is provided to an input of a subsequent storage element. The storage element 162, which is the $N+1^{th}$ storage element 162, provides the sample output signal SN.

In this way, by implementing the same types of storage elements 158-162, each of the sample outputs S0-SN can be delayed one cycle of the SAMPLE clock signal. It will be appreciated that other latch configurations or additional circuitry could be employed to implement other amounts of delay in the sample network 152. The detector 154 is operative to compute and determine the frequency of the INPUT signal provided by the system clock oscillator 156 to provide corresponding frequency data, such as described herein.

Figure 6:
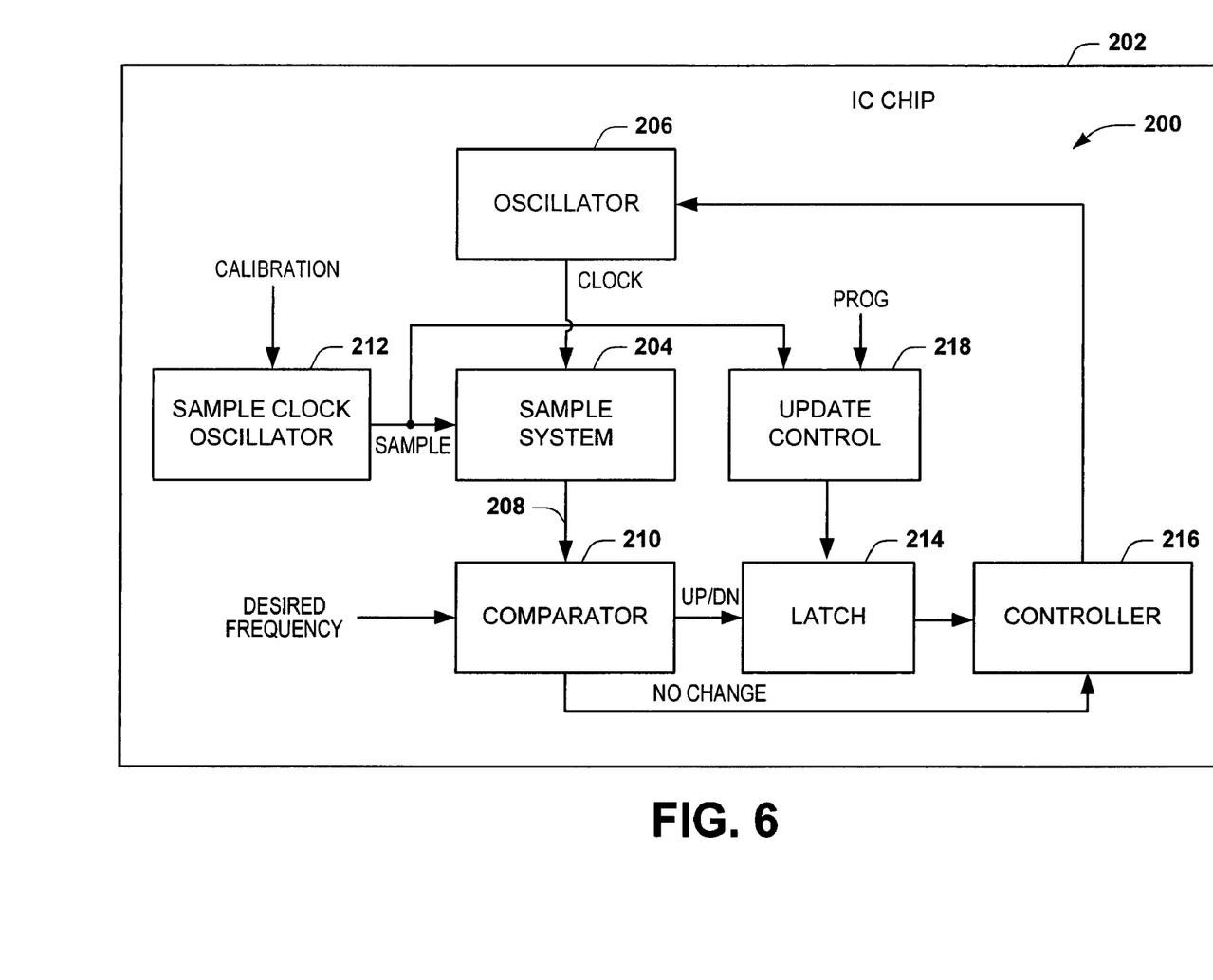
FIG. 6 depicts of an example of a synchronization system implementing a sampling system.

FIG. 6 illustrates an example of a system 200 that can be implemented in an integrated circuit (IC) chip 202, such as for synchronizing an internal CLOCK signal to a desired frequency. The desired frequency can be provided as a data value, which can be fixed or variable. For example, the chip 202 may receive an input signal (e.g., an external clock signal), such as can be provided by another chip or other source (not shown). The received signal can be sampled to provide the data indicative of the desired frequency. Alternatively, the desired frequency data can be set to a predetermined value, such as preset by a user or other associated circuitry (not shown) internal or external to the chip 202.

The system 200 includes a sample system 204. The sample system 204 is operative to sample the CLOCK signal provided by an internal oscillator 206 of the chip 202. For example, the sample system 204 performs oversampling (e.g., at least four times oversampling) on the clock signal sufficient to detect a series of two or more adjacent state transitions of the CLOCK signal. The sample system 204 provides one or more output signals 208 to a frequency comparator 210. The output signal 208, for example, can be provided as a P-bit digital word (or as P binary signals) indicative of the CLOCK frequency, where P is an integer (P≧1).

A sample clock oscillator 212 provides a sample clock signal to control sampling of the CLOCK signal by the sample system 204. The sample clock oscillator 212 can be set to provide a SAMPLE clock signal at a fixed frequency, such as based on a CALIBRATION signal. The CALIBRATION signal provides a predetermined sampling rate, such as for use when the frequency of the CLOCK signal is known in advance. An alternative approach is to design the sample clock oscillator to implement a sample rate at a sufficiently high rate (e.g., to provide at least four times oversampling) for any desired CLOCK frequency in the absence of the CALIBRATION signal. As mentioned herein, a desired sample rate can also be implemented by the sample system 204 where the sample clock oscillator provides a sample clock at a frequency that is less than the frequency of the CLOCK signal. According to another embodiment, the sample clock oscillator 212 can be omitted and the CLOCK signal itself be employed as the sample clock.

Those skilled in the art will appreciate various types of oscillators that could be employed as either of the oscillators 206 or 212. Examples of such oscillators, include crystal oscillators, RC oscillators, timer multi-vibrator oscillator circuits, field programmable gate array (FPGA) implemented oscillators and the like. Additionally, the oscillators 206 and 212 can be the same or different types of oscillators.

The frequency comparator 210 compares the frequency information provided by the signal 208 and the desired frequency data. The comparator 210 provides a comparator output signal to a latch 214. The comparator 210 also may provide another output signal to a controller 216. The comparator output signals, for example, provides an indication as to whether the internal clock frequency should be increased or decreased to the latch and/or whether no change in frequency is necessary. The comparator output signal thus can be a one-bit or multi-bit signal.

The frequency comparator 210 can compare the sampled output signal 208 with the desired frequency data to ascertain whether the CLOCK signal is at a desired frequency, which can be equal to or have a predetermined relationship (e.g., a ratio) or ratio relative to the desired frequency data. That is, the frequency comparator 210 is not limited to generating the comparator output signal for a synchronization scheme having a 1:1 ratio between the frequency of the desired frequency data and the sampled CLOCK signal data provided at 208.

The system 200 also includes an update control block 218 that receives the SAMPLE signal provided by the sample clock oscillator 212. The update control block 218 provides an output signal to control activation of the latch 214. For example, the update control block 218 controls how often the CLOCK signal is updated, such as based on the SAMPLE signal. The update may control block 218 also receive a program (PROG) signal that can be set to control the interval between updates, such as based on a predefined number of cycles of the SAMPLE signal. The PROG signal can be set to a fixed value, which can be programmed by a designer or based on detecting local operating characteristics (e.g., voltage, temperature, and the like). Additionally or alternatively, the PROG signal can be provided (e.g., by a controller) to enable the control block update 218 to adaptively set the interval between respective updates of the CLOCK frequency.

The latch 214 is coupled to propagate the comparator output signal (e.g., an UP/DN signal) to the controller 216 according to the control signal provided by the update control block 218. As mentioned above, the comparator output signal corresponds to data indicating whether the CLOCK frequency should be increased or decreased, such as based on a comparison of frequency information for the CLOCK signal and the desired frequency data.

The controller 216 receives the latched comparator output signal. The controller 216 may also receive another comparator output signal, namely a NO CHANGE signal. The NO CHANGE signal corresponds to control data indicating that no change to the CLOCK signal is required (e.g., the CLOCK frequency is within expected parameters of the desired frequency). While the UP/DN and the NO CHANGE comparator output signals are depicted as separate signals provided to the controller 216, a single multi-bit signal can be utilized, such as provided through the latch 214.

The controller 216 thus controls the clock oscillator 206 based on the comparator output signal(s) (e.g., the latched UP/DN and/or NO CHANGE signals). The controller 216 can implement such control by providing multi-bit control data to the clock oscillator 206. The control data, for example, may result in one or more components being selectively switched into and/or out of the clock oscillator 206, depending generally on the configuration of the oscillator. For instance, the oscillator 206 can decrease the frequency of the internal clock signal by adding one or more delay elements into the path of the CLOCK signal. In contrast, the oscillator 206 can remove one or more delay elements to increase the frequency of the CLOCK signal. The clock oscillator 206, in turn, provides the CLOCK signal with a frequency based on the control data provided by the controller 216.

By way of example, at power up for the chip 202, the oscillator 206 can generate the CLOCK signal at a predetermined starting frequency, such as based on the control signal from the controller 216 specifying such frequency. The update control block 218 can activate the latch 214 for updating the frequency of the CLOCK signal every S cycles, where S is positive integer (S≧1) denoting the number cycles that the update control block 218 implements each frequency update for the system 200. The value of S can change as a function of the operating mode of the chip 202. For instance, S can be a lower during a start-up mode to implement updates to the frequency of the internal clock signal more often. Then, after the CLOCK signal has sufficiently stabilized to the desired frequency, the value of S can be increased to implement less frequent updates (e.g., hundreds or thousands of cycles between updates). The frequency adjustments (e.g., an increase or decrease in frequency) can be an incremental with each update cycle.

Additionally, the controller 216 can modify the rate of updates as a function of operating conditions (e.g., process, voltage and/or temperature conditions) associated with the chip 202 and/or based on conditions of the environment in which the chip is implemented. For example, different chips across a circuit board or an arrangement of circuit boards may experience different voltage and temperature conditions, such as depending on their activity level, location relative to power supplies or heat sinks and the like. Furthermore, different chips can experience different process variations during fabrication that can affect their operation. Thus, the update control block 218 and the controller 216 can further control the interval for updating the frequency of the CLOCK signal according to changes in the operating conditions (e.g., voltage or temperature) associated with the chip 202 as well as based on known process variations.

The synchronization system 200 thus provides a simplified approach to provide a CLOCK signal at a desired frequency suitable for many applications. It will be appreciated that the system 200 can implement acceptable synchronization in the absence of a PLL or other hardware that is generally expensive or require extensive design efforts to implement on an IC chip. By way of example, the synchronization approach can be implemented for test chips and other test circuitry, such as may be utilized to verify signal integrity, power supply performance and input/output operations of associated circuitry (not shown) in the devices.

Figure 7:
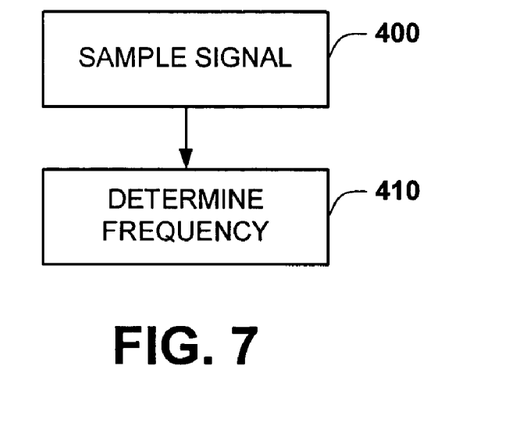
FIG. 7 is a flow diagram depicting a methodology for determining frequency.
Figure 8:
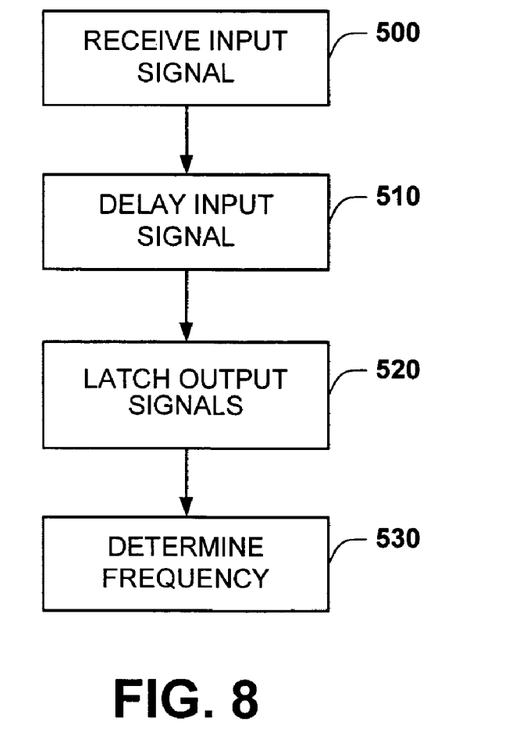
FIG. 8 is a flow diagram depicting another methodology for determining frequency.

In view of the foregoing structural and functional features described above, certain synchronization methodologies that can be implemented will be better appreciated with reference to FIGS. 7 and 8. While, for purposes of simplicity of explanation, the methodologies of FIGS. 7 and 8 is shown and described as being implemented serially, it is to be understood and appreciated that the illustrated actions, in other embodiments, may occur in different orders and/or concurrently with other actions. Moreover, not all illustrated features may be required to implement a methodology. It is to be further understood that the following methodologies can be implemented in hardware, such as one or more integrated circuits, software, or any combination thereof.

FIG. 7 depicts a method that comprises sampling a signal at predetermined spaced apart time intervals to provide a plurality of output samples indicative of signal state for different time instances of the signal, as shown at 400. The method further includes determining an indication of frequency for the signal based on the plurality of output samples, as shown at 410.

FIG. 8 depicts another embodiment of a methodology for determining frequency. The methodology begins at 500 in which an input signal is received. The input signal can be provided by a signal source, such as a clock signal provided by an internal or external clock generator of an IC chip. At 510, the signal is delayed. The delay can be implemented by passing the signal through a plurality of components or delay elements arranged to delay the signal a desired amount. For example, the components can provide respective output signals, which are delayed representations of the input signal corresponding to different amounts of delay. The amounts of delay can be any amount of delay so that the output signals can represent at least four different time instances of the input signal in a given period of the input signal.

At 520, the output signals are latched. By latching the output signals at 520, a composite signal (or plural signals) is provided that represents signal state of the input signal at a plurality of spaced apart time intervals. For example, the latching is implemented by generating a plurality of clock edges in a given duration of the input signal (e.g., one-half of a period or more) so that two or more state transitions can be detected. At 530, the frequency of the input signal is determined based on the signal state information provided in the latched output signals. For example, the frequency can be reconstructed from the output signals, such as based on the amount of delay associated with output signals represent a state transitions in the input signal (e.g., from a falling edge to a rising edge, from a rising edge to a falling edge, or from a rising or falling edge to a next rising or falling edge). An example of output signals and a corresponding determination of frequency is described herein with respect to the graph of FIG. 3.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
a sample network that provides plural samples of an input signal state for different time instances of the input signal, each of the plural samples corresponding to the input signal delayed by a known amount of time;
a detector that determines the frequency of the input signal based on (i) the samples of the input signal state received by the detector for the different time instances of the input signal residing within less than or equal to one period of the input signal, and (ii) the known amount of time for each of the plural samples, the detector provides a value that represents the determined frequency of the input signal;
a comparator that provides a comparator signal based on a comparison of the value of the frequency for the input signal and a value of a desired frequency; and
a controller operative to implement adjustments to a clock signal based on the comparator signal.

2. The system of claim 1, the sample network further comprising a plurality of storage elements arranged to provide output samples corresponding to the plural samples of the input signal state.

3. The system of claim 2, further comprising delay elements associated with at least a substantial number of the storage elements, the delay elements providing respective delayed clock signals to clock the at least a substantial number of the storage elements to sample the input signal at different time intervals and thereby provide the plural samples of the input signal state.

4. The system of claim 3, wherein the input signal is delayed by the delay elements to provide the respective delayed clock signals.

5. The system of claim 2, further comprising an oscillator that provides a second clock signal for activating at least a substantial number of the storage elements to provide the plural samples of the input signal state to the detector.

6. The system of claim 5, wherein the oscillator provides the second clock signal at a frequency that is one of lower and higher than the frequency of the input signal.

7. The system of claim 5, further comprising delay elements associated with at least N of the storage elements, where N+1 is a positive integer denoting the number of the storage elements, the delay elements each having a fixed known amount of delay for providing respective clock edges for clocking the at least N of the storage elements, each of the respective clock edges corresponding to a different delayed version of the second clock signal such that a different time instance of the input signal is latched into each of the at least N of the storage elements.

8. The system of claim 7, wherein the delay elements are connected in series so that the amount of delay for a given clock edge corresponds to an aggregate amount of delay according to the number of delay elements in the path from the oscillator to the storage element activated by the given clock edge.

9. The system of claim 2, wherein an output of a preceding storage element is coupled to an input of a next storage element.

10. The system of claim 8, wherein the input signal is provided directly to an input of each of the storage elements such that the storage elements provide the output samples based on delayed activation by each given clock edge.

11. The system of claim 1, wherein the sample network further comprises a plurality of storage elements activated at time intervals to latch output samples concurrently to the detector corresponding to the samples of the input signal state.

12. The system of claim 1, further comprising an oscillator that generates the input signal as a clock signal having a frequency based on a controller output signal provided by the controller.

13. An integrated circuit chip comprising the system of claim 1.

14. A system comprising:
- a plurality of storage elements, the plurality of storage elements being clocked to latch different time instances of an input signal to provide corresponding output samples of the input signal sufficient for determining a frequency value of the input signal;
- a plurality of delay elements associated with at least a substantial number of the storage elements, each of the delay elements delaying a sample signal by a respective known amount of time to provide a respective clock signal corresponding to a delayed version of the sample signal that clocks a respective one of the at least a substantial number of the storage elements to latch a respective one of the different time instances of the input signal to provide at least a portion of the corresponding output samples; and
- a detector that provides a frequency value for the input signal based (i) on the output samples that correspond to the different time instances of the input signal and (ii) the known amount of time for each of the respective delay elements;
- wherein the input signal comprises the sample signal, the input signal being delayed by the plurality of delay elements to provide the respective delayed clock signals for clocking the at least a substantial number of the storage elements to latch the different time instances of the input signal into the storage elements.

15. The system of claim 14, further comprising an oscillator that provides the sample signal to at least one of the plurality of delay elements based on which the respective clock signals are provided for latching the different time instances of the input signal into the plurality of storage elements to provide the corresponding output samples.

16. The system of claim 15, wherein each of the respective clock signals corresponds to a different delayed version of the sample signal.

17. The system of claim 16, wherein the delay elements are connected in series so that the amount of delay for a given clock signal corresponds to an aggregate amount of delay according to the number of delay elements in the path from the oscillator to the storage element activated by the given clock signal.

18. The system of claim 17, wherein the input signal is provided directly to an input of each of the storage elements such that the storage elements provide the corresponding output samples based on when each of the storage elements are clocked by the respective clock signals.

19. The system of claim 14, wherein the plurality of storage elements are clocked by the respective clock signals at predetermined time intervals to latch the output samples to the detector concurrently to provide the corresponding output samples that represent the different time instances of signal state for the input signal.

20. The system of claim 14 wherein the frequency value is expressed in units of an inverse of a period of the input signal.

21. A frequency detection system comprising:
- means for sampling an input signal having an unknown frequency and for providing plural indications of signal state associated with different time instances of the input signal delayed for different known amounts of time;
- means for determining a frequency for the input signal based on (i) the plural indications of the signal state received by the means for determining, that correspond to the time instances of the input signal residing within a single period of the input signal, and (ii) the known amounts of time;
- means for providing a corresponding frequency value for the determined frequency;
- means for comparing the frequency value relative to a desired frequency value; and
- means for controlling the frequency of the input signal based on the comparison of the frequency of the input signal and the desired frequency.

22. The system of claim 21, further comprising means for delaying sampling of the input signal by selected parts of the means for sampling.

23. The system of claim 21, wherein the means for delaying further comprises means for delaying a clock signal to provide activation signals that control sampling performed by the means for sampling.

24. The system of claim 21, wherein the means for sampling further comprising a plurality of means for storing signal state information based on an activation signal.

25. A method comprising:
- sampling a signal at predetermined and spaced apart time intervals to provide a plurality of output samples indicative of signal state for different time instances of the signal;
- determining a frequency value for the signal that represents a frequency of the signal based on (i) the output samples received at a detector that correspond to time instances of the signal residing within a single period of the signal, and (ii) the predetermined and spaced apart time intervals;
- controlling an oscillator to provide the signal at a frequency based on a comparison of the frequency value for the signal relative to a desired frequency value.

26. The method of claim 25, the sampling further comprising activating a plurality of storage elements to provide the plurality of output samples concurrently.

27. The method of claim 26, the activation further comprising generating clock edges at the predetermined and spaced apart time intervals that are provided to activate the plurality of storage elements.

28. The method of claim 27, the generation of clock edges further comprising delaying a clock signal to provide the clock edges.

29. The method of claim 26, further comprising delaying propagation of the signal through the plurality of storage elements having known amounts of delay to establish the predetermined and spaced apart time intervals at which the signal is sampled.

30. The method of claim 26 further comprising providing a clock signal to control the activation of the storage elements.

31. The method of claim 25, wherein the controlling further comprises providing at least one control signal to cause the oscillator to one of increase, decrease and not change the frequency of the signal.

* * * * *

UNITED STATES PATENT AND TRADEMARK OFFICE
CERTIFICATE OF CORRECTION

| | |
|---|---|
| PATENT NO. | : 7,475,270 B1 |
| APPLICATION NO. | : 10/699909 |
| DATED | : January 6, 2009 |
| INVENTOR(S) | : Jason Harold Culler |

Page 1 of 1

It is certified that error appears in the above-identified patent and that said Letters Patent is hereby corrected as shown below:

In column 12, line 24, in Claim 23, delete "claim 21" and insert -- claim 22 --, therefor.

Signed and Sealed this

Twenty-first Day of April, 2009

JOHN DOLL
*Acting Director of the United States Patent and Trademark Office*